US010181163B2

(12) United States Patent
Santos et al.

(10) Patent No.: US 10,181,163 B2
(45) Date of Patent: Jan. 15, 2019

(54) ADMINISTRATOR STATUS CLAIMING AND VERIFICATION

(71) Applicant: Microsoft Technology Licensing, LLC, Redmond, WA (US)

(72) Inventors: Timothy Vergara Santos, Milpitas, CA (US); Maya Kreidieh, Mountain View, CA (US); Arthur Switalski, San Carlos, CA (US); Aviad Pinkovezky, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 340 days.

(21) Appl. No.: 14/725,539

(22) Filed: May 29, 2015

(65) Prior Publication Data

US 2016/0350874 A1    Dec. 1, 2016

(51) Int. Cl.
| | |
|---|---|
| *H04L 12/24* | (2006.01) |
| *G06Q 50/00* | (2012.01) |
| *H04L 29/08* | (2006.01) |
| *G06Q 10/10* | (2012.01) |

(52) U.S. Cl.
CPC ............. *G06Q 50/01* (2013.01); *G06Q 10/10* (2013.01); *H04L 67/306* (2013.01)

(58) Field of Classification Search
CPC ....... G06Q 50/01; G06Q 10/10; H04L 67/306
USPC ........................................................ 709/219
See application file for complete search history.

(56) References Cited

U.S. PATENT DOCUMENTS

| | | | | |
|---|---|---|---|---|
| 2010/0268705 A1* | 10/2010 | Douglas | ................ | G06Q 10/06 707/723 |
| 2011/0314065 A1* | 12/2011 | Cox | ...................... | G06Q 50/01 707/803 |
| 2013/0205215 A1* | 8/2013 | Dunn | ..................... | G06Q 50/01 715/738 |
| 2013/0268373 A1* | 10/2013 | Grishaver | ............. | G06Q 30/02 705/14.67 |
| 2013/0340097 A1* | 12/2013 | Gowel | ................... | G06Q 10/10 726/28 |
| 2014/0012908 A1* | 1/2014 | Manry | .................. | G06Q 50/01 709/204 |
| 2014/0201345 A1* | 7/2014 | Abuelsaad | .......... | H04L 41/5067 709/223 |
| 2014/0222702 A1* | 8/2014 | Jennings | ................ | G06Q 50/01 705/319 |
| 2015/0242749 A1* | 8/2015 | Carlton | .................. | G06Q 50/01 706/47 |

(Continued)

*Primary Examiner* — Moustafa M Meky
*Assistant Examiner* — Elizabeth Kassa
(74) *Attorney, Agent, or Firm* — Schwegman Lundberg & Woessner, P.A.

(57) ABSTRACT

Generally discussed herein are methods, systems, and apparatuses for managing administrators of respective company profile pages. A method can include determining the company profile page is an auto-created company profile page, prompting one or more users with a profile that indicates the user currently works for a company associated with the company profile page to become the administrator of the company profile page, in response to a user of the one or more users responding affirmatively to the prompt, prompting the user for information regarding the company, and assigning administrator rights to the user in response to receiving sufficient information about the company from the user.

18 Claims, 4 Drawing Sheets

(56) References Cited

U.S. PATENT DOCUMENTS

2015/0332029 A1* 11/2015 Coxe .................. H04L 63/0815
726/9

* cited by examiner

ADMINISTRATOR STATUS CLAIMING AND VERIFICATION

TECHNICAL FIELD

Examples generally relate to systems, apparatuses, and methods for management of administrators. Some examples relate more specifically to reaching out to and encouraging a user of a social network site to become an administrator for a profile page of a company.

BACKGROUND

There may be companies with respective profile pages on a social network site without an administrator (hereafter "admin"). In order to enrich company profile data and unlock more value of these profile pages, it may be advantageous to have a profile page admin. Currently, if a member of the social network wants to become an admin, the member must contact customer support to be added as the admin. This step of contacting customer support is onerous and inconvenient for a user who wishes to become an admin and for the customer support staff that facilitate the assignment of admin status.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed herein.

DETAILED DESCRIPTION

Discussed generally herein are systems, devices, and methods for management of administrators of profile pages, which can include contacting (e.g., encouraging and/or prompting) a user of a social network site to become an admin for a profile page of a company on the social network. On the popular social networking site LinkedIn, accessible at www.linkedin.com and hosted by LinkedIn Corporation of Mountain View, Calif., there can be millions of companies with profile pages that do not have an admin at a given time. A company profile page may be auto-created or created by a user. An admin for a profile page can be beneficial for the profile page by enriching data of the profile page, such as by providing new data and/or verifying data already on the company's profile page. The admin can also be helpful in expanding the number of users that list the company as an employer (e.g., past or current employer) or the number of users that follow or like the company, such as to allow the user to conveniently consume the content distributed by the company (e.g., articles, jobs, or other posts on behalf of the company). The admin can add one or more secondary administrators, edit the company's profile page, and/or provide an update for the company, through a post to the company's profile page, among other operations.

A device, system, or method (e.g., a partially to fully automated method) can help increase the number of company profile pages that have an admin. Such embodiments include reaching out to a user associated with a company (e.g., employed by or otherwise working at or for the company) and asking the user to become an admin for the company's profile page. In one or more embodiments, the users associated with the company can be scored, such as to determine if the user is qualified to be an admin of the profile page. In one or more embodiments, only users with a score above a specified threshold may become the admin of the company's profile page, such as to help ensure that the admin of the page is qualified to be the admin.

Reference will now be made to the figures to describe details of one or more embodiments. Generally, an embodiment is discussed with reference to a social network system that can include a company profile page, however, the system is not limited to this context. The system(s), apparatus(es), and method(s) can be implemented in one or more modules that can be implemented on a computing device as a standalone, add-on, or plug-in for another application, among other implementations.

Figure 1:
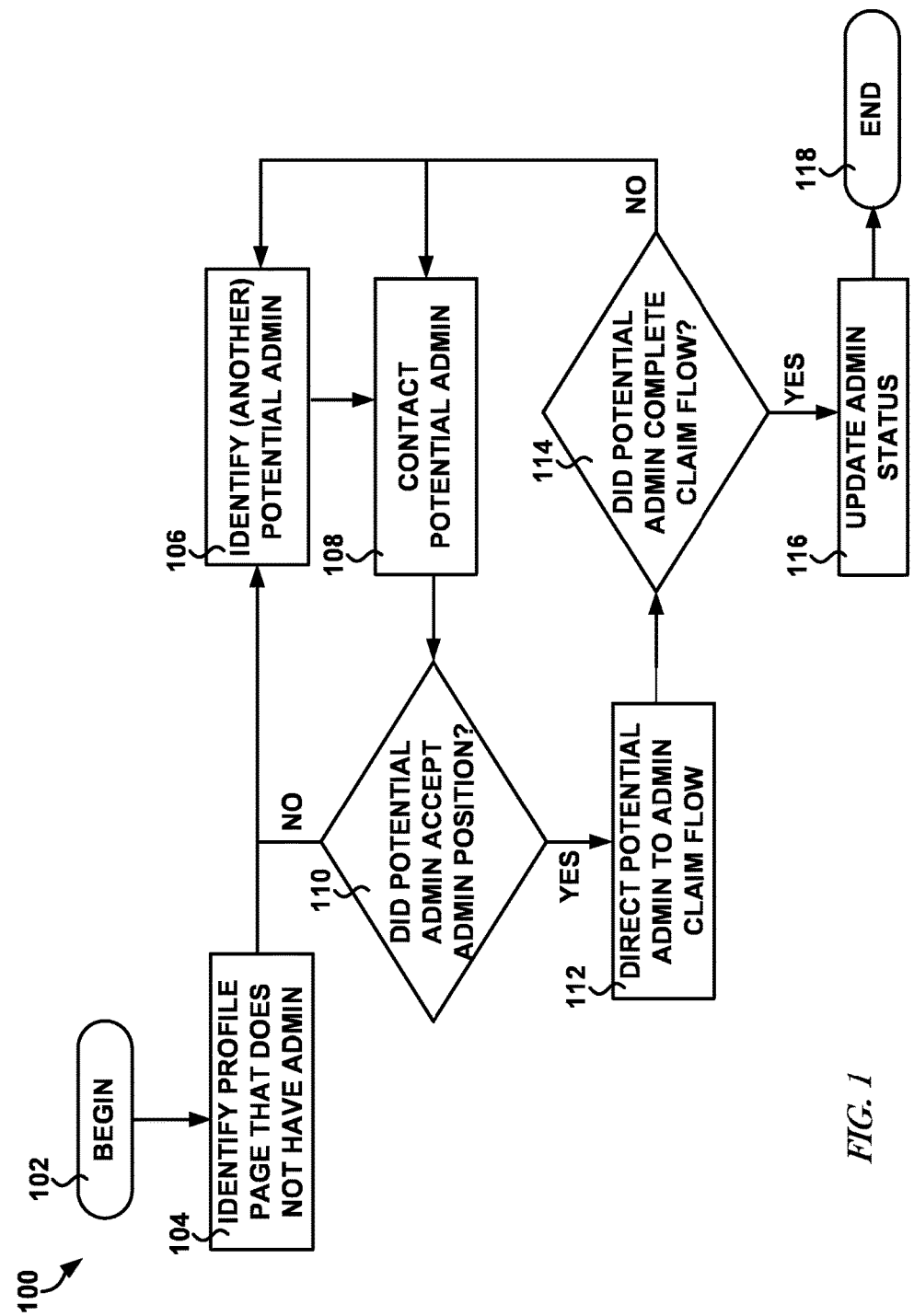
FIG. 1 illustrates, by way of example, a flow diagram of an embodiment of a process for contacting a potential admin of a profile page.

FIG. 1 illustrates, by way of example, a flow diagram of an embodiment of a process 100 for contacting a potential admin of a profile page. The process 100 as illustrated includes beginning, at operation 102; identifying a profile page that does not have an admin, at operation 104; identifying (another) potential admin, at operation 106; contacting a potential admin, at operation 108; determining if the potential admin accepted the admin position, at operation 110; directing the potential admin to an admin claim flow process, at operation 112; determining if the potential admin sufficiently completed the claim flow process, at operation 114; updating admin status, at operation 116; and ending at operation 118.

At operation 104, a profile page that does not have an admin is identified (e.g., automatically identified). Identifying a profile page that does not have an admin can include determining if an admin has been assigned to a profile page and/or if the company profile page is auto-created. Whether a company has an admin can be determined in a variety of ways, such as by looking up an indicator (e.g., company_admin=0 or 1 or other indicator) in a database (e.g., a relational database, such as profile data database 204, see FIG. 2). For example, if company_admin is set to one, this can mean that the company profile page related to the indicator does have an admin.

The profile page can be an auto-created profile page. An auto-created profile page is a profile page that is not created by a representative of the company, but rather is created based on an inference that the company exists and does not currently have a profile page. The profile page can be at least partially created with or without human interference. As used herein, "automatically" means without human interference after deployment. A process to auto-create a profile page of a company can include analyzing profiles of users of the social networking site, including an employment history of the users as listed in their profile. A company (e.g., a company name and/or company identification number) associated with an employment position in the employment history of the user can be extracted from the profile of the user. Next it can be determined if the company has a profile page on the social networking site, such as by attempting to look up the company name or a company identification number in a database of company names or company identification numbers. If the company name or company identification does not match any entries in the database the company can be determined to not have a profile page. A profile page can be auto-created for such companies.

The auto-created profile page can include data about the company that is gathered (e.g., automatically), such as from the profile(s) of user(s) that include the company in their profile, from the internet (e.g., a company website or other website that includes information regarding the company), crowdsourcing, or other source. A company with an auto-created profile page can be associated with an entry in a database that indicates the profile page for the company was auto-created (e.g., company_autocreated=0 or 1 or some other indicator). For example, if company_autocreated is set to one, this can mean that the company profile page related to the indicator was auto-created.

At operation 106, a potential admin for the profile page that was identified at operation 104 is identified. The potential admin can be a current employee (e.g., an employee, contractor, or otherwise perform work for the company, such as according to their profile). In one or more embodiments, a score can be determined for each of the current employees of the company. The score can be determined based on one or more attributes of the employee. The one or more attributes can include one or more of the number of connections the employee has on the social networking site, a profile completeness score of the employee, the title of the employee at the company, and the seniority of the employee at the company, among other attributes.

The score can include a weighted or un-weighted sum of scores for each attribute to be scored. Different weights can be provided for different attributes based on their importance for a user to become an admin. For example, consider two users (employee one and employee two) who are both employees of a company that has a profile page that does not have an admin. Employee one is a content specialist that has been at the company for less than a year and employee two is a founder and owner of the company. The score for employee one can be higher than the score for employee two because, while both employees are qualified to be the admin of the profile page, the content specialist is a specialized position with the responsibility of giving the company a consistent voice. Note that different weights can be specified for different attributes such that, given the same two employees, the score of the respective employee can be greater or lesser than the other employee.

In another example, consider an employee (employee three) that has a title of manager, a profile that is 30% complete, been at the company for one year, and ten connections, and another employee (employee four) that has a title of customer service specialist, a profile that is 100% complete, been at the company for less than a year, and five hundred connections. The score function can be defined as score=weight1*title score+weight2*completeness score+weight3*seniority score+weight4*connections score. By adjusting the weights for each individual score the relative importance of the score can be defined. For example, if weight1 is high relative weight2, the title can have a bigger impact on the overall than the completeness of a user profile. If weight4 is weighted high relative to the other weights, then employee four is more likely to have a higher score than employee three. The weights can be any value as long as they are set relative to one another. Weights can be real numbers, integers, positive, negative, etc.

Consider the example just described where weight1 is ten (10), the title score of the manager position is one hundred (100), the title score of the customer service specialist position is fifty (50), weight two is also ten (10), the seniority score associated with one year of seniority is one (1), the seniority score associated with less than one year is zero (0), weight3 is one hundred (100), and weight4 is also ten (10). In this example the seniority of the employee is considered more important than other attributes, since weight3 is high relative to the other weights. With this scoring, the score for employee three is 10*100+10*1+10*0.3+10*10=1113, and the score for employee four is 10*50+10*0+10*1.0+10*500=5510. By this scoring rubric, employee four would be determined more likely to be a good potential admin than employee three.

Regardless of how the score is determined, the score can be compared to a threshold score. If an employee does not have a score that is greater than (or equal to) the threshold score, that employee can be filtered out from the users that are labeled as a potential admin. If an employee has a score that is greater than (or equal to) the threshold score, the employee can be filtered into a pool of users that are labeled as a potential admin. Labeling a user as a potential admin can include associating an indicator (e.g., BizPermissionType=1 or 0 or other indicator) with the user, such as in a profile data database. For example, if BizPermissionType=0, then the user can be filtered out of the pool of users that are potential admins. In an embodiment in which the threshold is set at 2000, then employee three would be filtered out of the potential admins (e.g., BizPermissionType=0) and employee four would be considered a potential admin, such as by setting BizPermissionType=1.

At operation 108, an employee that was determined to be a potential admin at operation 106 is contacted. Contacting a potential admin can be accomplished in a variety of ways, including, but not limited to, an email, an indication on the company profile page, an indication on the homepage of the user, and/or an indication in response to a user opening a web browser. Contacting a potential admin can be done individually or in batch (i.e. selecting more than one potential admin and contacting each of them before hearing back from the others). The contact to the potential admin can include text, graphics, a link (e.g., a hyperlink), a control, or the like that indicates to the potential admin that the profile page needs an admin. The link can include a link to an admin claim flow process that is a formal process of setting up an admin for the profile page. The control can prompt the potential admin to elect whether to be the admin for the profile page or not.

At operation 110, it is determined whether the potential admin accepted the position. In an embodiment in which a potential admin was contacted individually and the potential admin declines the position, the process 100 can continue at operation 106. In an embodiment in which multiple potential admins were contacted (at operation 108) and all potential admins have declined, the process 100 can continue at operation 106. If the potential admin accepts the position, whether in batch or individual processing, the process 100 can continue at operation 112.

A potential admin accepting the position can include the potential admin replying to the email with a specified response (e.g., "YES" or other text), the potential admin clicking on a link provided in the contact with the potential admin (at operation 108), or the potential admin activating a control provided in the contact with the potential admin, among others.

A potential admin declining the position can include the potential admin replying to the email with a specified response (e.g., "NO" or other text), the potential admin not clicking on a link provided in the contact with the potential admin (at operation 108) for a specified period of time (e.g., a day, week, month, etc.), the potential admin activating a control provided in the contact with the potential admin, the potential admin not responding or otherwise interacting with the contact so as to indicate an acceptance or decline of the position for a specified period of time (e.g., a day, week, month, etc.), among others.

In an embodiment in which multiple potential admins have been contacted, a conflict between users interested in becoming the admin of the profile page can occur. To help avoid a conflict, it can first be determined if the profile page has one or more admins. If the profile page has one or more admins, then the claim flow process for that profile page can be disabled so as to prevent another user from claiming admin status.

In one or more embodiments, a potential admin can nominate a second user as an admin for the profile page (e.g., by forwarding the secure token to another user). In such embodiments, the second user can provide the secure token (as forwarded to them from the potential admin). It can be determined that the second user does not have an indicator that indicates the second user is a potential admin, and the indicator can be changed to indicate that the second user is a potential admin. Then the second user can be provided access to the admin claim flow process.

A secure token can be created that is required to gain access to the admin claim flow. The secure token can include a hash of a string (e.g., a company identification, name, industry, Uniform Resource Identifier (URI) of an admin claim flow process for the profile page, and/or other string). The potential admin can be required to provide the secure token to gain access to an admin claim flow process (a process that must be sufficiently completed before the user is assigned admin status of the company profile page). In response to the potential admin providing the secure token, the admin claim flow can be locked to prevent all other potential admins from claiming admin status of the company profile page. In one or more embodiments, the secure token can be passed between users, such that a user who receives the token from another user, but does not meet the potential admin criteria may try to gain access to the admin claim flow. To help prevent the user with insufficient criteria from claiming the admin position, a potential admin may also be required to identify themself before gaining access to the admin claim flow process. After the potential admin identifies themself, it can be verified that they are a potential admin (e.g., BizPermissionType=0).

A qualification check can be performed on a nominated admin before changing the indicator to indicate that they are a potential admin. The qualification check can include determining if the nominated admin works for the company associated with the profile page, the profile page of the nominated admin sufficiently complete (e.g., complete to at least a specified threshold), the nominated admin has a threshold number of connections, and/or the like.

At operation 112, the potential admin that accepted the invitation to become the admin (e.g., before another potential admin accepted the invitation) in the contact from operation 108 is directed to an admin claim flow. Operation 112 can be accomplished in a variety of ways. In one or more embodiments, the contact with the potential admin (at operation 108) can include a link that directs the potential admin to the admin claim flow if the potential admin activates the link. In one or more other embodiments, the contact with the potential admin (at operation 108) can direct the potential admin to the company profile page on the social networking site. The company profile page can display a control (e.g., a button, an active banner, or other control) that, when activated by the potential admin, redirects the potential admin to the admin claim flow. As discussed previously, the potential admin may be required to provide the secure token and/or other identifying information to access the admin claim flow.

The control (or the link) can redirect the potential admin to an address (e.g., using a URI, such as a Uniform Resource Locator (URL)) of the admin claim flow. In one or more embodiments, it can be determined if the company associated with the profile page currently has an admin and/or whether the user attempting to access the admin claim flow includes potential admin status (e.g., BizPermissionType set to zero).

A user that has been given potential admin status for one company may change jobs between the time the potential admin status has been granted and contact is made with the potential admin or the potential admin accepts or declines the position as admin. Thus, security measures can be put in place to help ensure that a user accepting the admin position still works for the company associated with the profile page. An example of such a security measure includes verifying that the user still works at the company by monitoring the users profile for an update in their employment history or asking one or more other users to verify that the potential admin still works for the company. Another example of such a security measure includes requiring the potential admin to check a box certifying that they are an official representative of the company in the admin claim flow process.

At operation 114, it is determined if the potential admin sufficiently completed the admin claim flow process (i.e. provided information required to become the admin). If the user has sufficiently completed the admin claim flow process, the admin status of the company profile page and/or the admin status of the user that completed the claim flow process can be updated. Such updating can include issuing a post request to a database (e.g., the database 204, see FIG. 2) to update the status indicator of the user and/or the company (e.g., company_admin or user_admin set to one or zero). If the user has not sufficiently completed the admin claim flow process, the process 100 can continue at either of operations 106 or 108. If there is another potential admin already identified, the process 100 can continue at operation 108. If no other potential admin has yet been identified, the process 100 can continue at operation 106. In one or more embodiments, the potential admin that did not sufficiently complete the claim flow process can be warned that they are not the admin. The warning can include the steps the potential admin must take to become the admin. In one or more embodiments, a potential admin that did not complete the admin claim flow process can lose potential admin status (e.g., after a specified period of time without completing the process), such as by setting BizPermissionType to reflect that they are no longer a potential admin. If the process 100 continues at operation 108, the contact to the potential admin can include information indicating that the potential admin did not sufficiently completely the admin claim flow process and/or asking the potential admin if they would like to continue with the claim flow process or decline the admin position. The operation at 110 can then be performed. The process can end at operation 118.

The admin claim flow process can include prompting the potential admin to provide information about the company associated with the profile page. The admin claim flow process can include requiring the potential admin to provide information about the company, such as by filling in a form (e.g., text boxes with prompts). In response to the potential admin providing required information regarding the company and/or certifying that they are an official representative of the company, the admin status of the company (e.g., the indicator company_admin) can be changed to reflect that the company now has an admin (e.g., company_admin is set to zero) and access to the admin claim flow process can thus be disabled for the profile page.

In one or more embodiments, a user can be required to provide a minimum amount of information about a company to be considered the admin for the profile page of that company. Such required information can include one or more of the company name, the industry of the company (e.g., as selected from a list of pre-defined industry descriptions or categories), a size of the company (e.g., as selected from a list of pre-defined sizes or groups of sizes), and a validation that the potential admin is an official representative of the company (e.g., a check box that a user needs to actively select or an indication to the user (e.g., a message) that conveys to the user that the user agrees that by selecting a control object the user is verifying that they are an official representative of the company and/or that the data provided is accurate to the best of their knowledge.

A potential admin may leave (e.g., click-out of) the admin claim flow process prior to completing the required information for becoming the admin of the profile page. To help ensure that the data entered into the admin claim flow process is saved, the data entered by the potential admin can be saved as it is entered or as each field is completed. For example, if the potential admin completes the "name" field, a request to update the company data in a database can be issued. The database server can verify that the company does not have an admin prior to granting a post request to the database to write the data entered into the field into the profile page of the company. The request can include an Asynchronous JavaScript and Extended Markup Language (AJAX) Post request that includes data formatted in a JavaScript Object Notation (JSON) format. An example of such JSON formatted data is provided:

```
"entryPage":
{
"name": "Bluth Company",
"website" : "bluth.com",
"email": "@bluth.com",
"industry": "ACCOUNTING",
"employeeCount": "2-3 Employees"
}
```

The potential admin can be prompted to provide more information beyond information that is required for the potential admin to become the admin. This data can include one or more of a logo for the company that can be displayed on the profile page, a description of the company (e.g., a mission statement of the company, a statement regarding the operations of the company, or other pertinent description of the company), an address of the company (e.g., city, state, zip code, country, etc.), the business type of the company, and the year the company was founded, among other potential data regarding the company. In the admin claim flow process, the potential admin can be prompted to provide a hero image that can serve as a banner for the company on the company profile page. A call can be made to a media uploader that receives a URI of the uploaded image. The URI of the uploaded image can be stored to the company profile page data on the database, such as by using an AJAX post request with JSON data that includes the URI as part of the JSON data.

Figure 2:
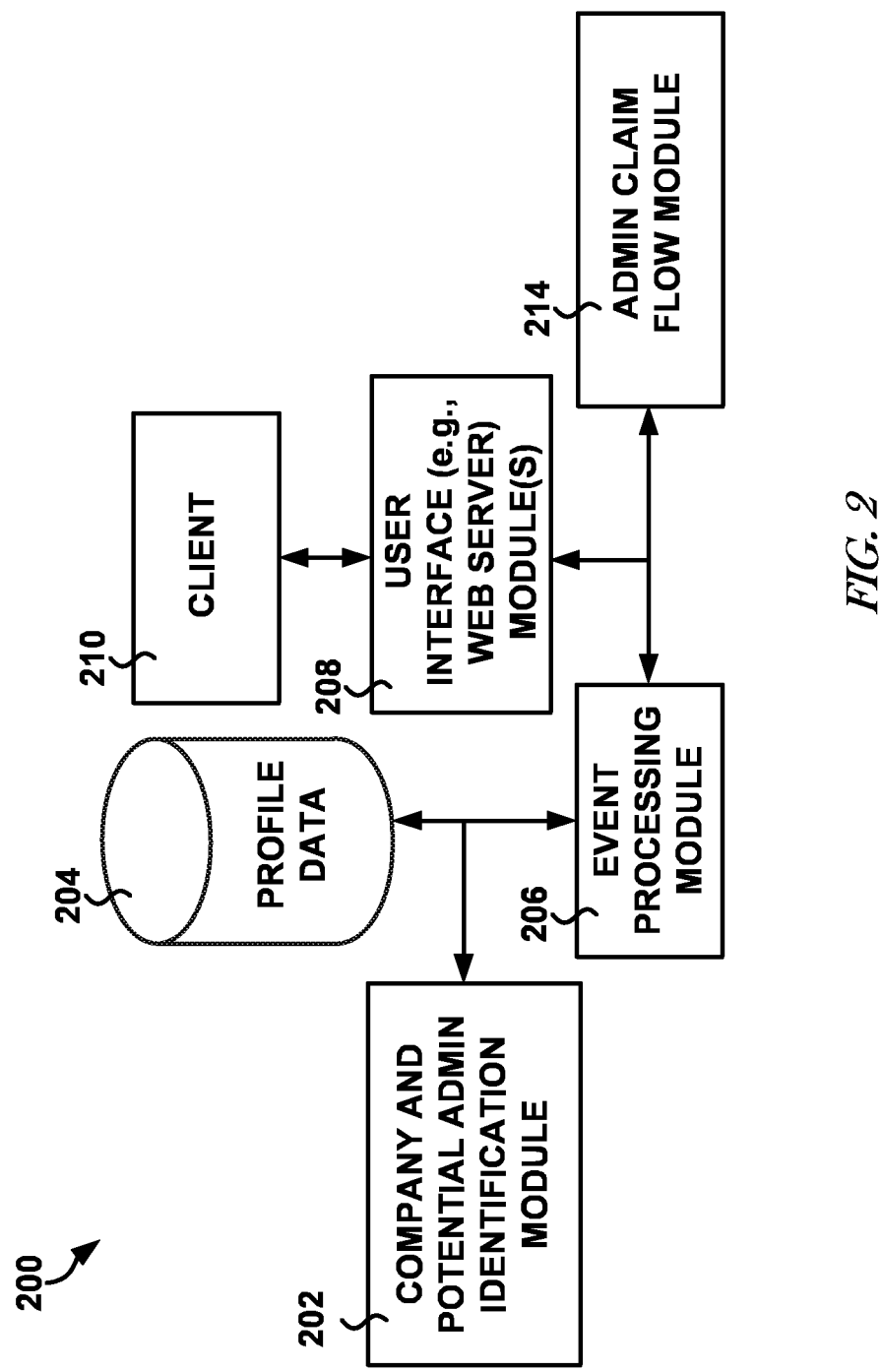
FIG. 2 illustrates, by way of example, a block diagram of an embodiment of a system for contacting a potential admin of a profile page.

FIG. 2 illustrates, by way of example, a block diagram of an embodiment of a system 200 for contacting a potential admin of a profile page. As illustrated, the system 200 includes company and potential admin identification module 202, a profile data database 204, an event processing module 206, a user interface (UI) 208, a client 210, and an admin claim flow module 214.

The company and potential admin identification module 202 identifies companies that do not have admins for their profile page and also identifies one or more users that are potential admins for the identified company. The company and potential admin identification module 202 performs the operations at 104 and 106. The module 202 can accomplish this by querying the profile data database 204 for a company with an indicator (e.g., company_admin) that is set to a value that indicates the company profile page does not have an admin. In one or more embodiments, the identification module 202 queries the profile data database 204 for companies that are both auto-created and do not have an admin.

To identify a potential admin, the module 202 can query the profile data database 204 for users that currently work for or are otherwise authorized to represent the company that does not have an admin. The module 202 can score the returned users based on one or more attributes of the user profile data (e.g., the title of the user at the company, the number of connections of the user, the profile completeness of the user, the longevity of the user at the company, and/or other attributes). The module 202 can compare the score to a threshold, such as to filter out users that would not make good admins based on the score. The module 202 can write to the profile data to set an indicator that indicates whether or not a user is a potential admin (e.g., BizPermissionType). For example, if a user's score is below the threshold, the module 202 can write "BizPermissionType=0" into the profile of that user so as to indicate that user is not qualified to be the admin, or if the user's score is above the threshold, the module 202 can write "BizPermissionType=1" into the profile of that user so as to indicate that user is qualified to be the admin.

The profile data database 204 can include one or more relational databases that include member profile data related to non-user entity (e.g., a company, school, charity, non-profit organization, or other non-individual user entity) profile page data. The profile data of an individual user can include current and past employment positions of the user, title(s) of employment position(s), number of contacts, and/or profile completeness, among other information. The profile data can be indexed according to user/entity or other indexing scheme that allows the data to be retrieved (e.g., queried and returned) by the module 202 and/or 206. In one or more embodiments, the company and potential admin identification module 202 and the database 204 can be implemented as a Hadoop® cluster. The company and potential admin identified by the module 202 can be stored in a database (e.g., the profile data database 204) or other database accessible by the event processing module 206.

In one or more embodiments, the event processing module 206 determines one or more potential admins and initiates the contact with one or more of those users determined to be potential admins. The event processing module 206 can perform the operations 108, 110, 112, 114, and 116 of the process of FIG. 1. The event processing module 206 can provide the client 210, through the UI module 208, with at least some of the data (e.g., password, encryption key, decryption key, secure token, or the like) needed to access the admin claim flow module 214.

In one or more embodiments in which the company and potential admin are determined online, the event processing module 206 can query the profile data database 204 to determine if the company has an admin. If the company has an admin, the event processing module 206 does not perform further operation. If the company does not have an admin, the event processing module 206 determines if a user associated with the entity of the profile page has an indicator that indicates the user is a potential admin for the company. The user can be added to a notification list that details users that will receive a contact asking the user to become the admin for the company.

In one or more embodiments in which the company and potential admin are determined offline, the event processing module 206 can look up the identified company and potential admin in the location at which the data is stored (e.g., on the notification list). No matter how the potential admin and the company are identified, the event processing module can contact the potential admin to encourage or ask the potential admin if they accept or reject the position as the admin of the company profile page.

The event processing module 206 can detect when a user visits a site with sufficient credentials to become an admin for the site (e.g., the user works for the company, they have a BizPermissionType indicator that indicates they are qualified to be the admin, and the site does not currently have an admin). The event processing module 206 can modify the site as displayed to the potential admin, such as by adding a graphic to the site that is displayed when the potential admin visits the site. The graphic illustrates or otherwise conveys to the user that the user can be an admin of the site.

The user interface module (e.g., a web server) 208 can receive requests from various client-computing devices, and communicate appropriate responses to the requesting client 210. The client 210 can include a device, such as a laptop, tablet, phone, Smartphone, desktop, Personal Digital Assistant (PDA), e-reader, or other computing device, such as a computing device capable of connecting to the internet. The client 210 can communicate with a social networking system (see FIG. 3), which can include the company and potential admin identification module 202, the profile data database 204, the event processing module 206, and/or the admin claim flow module 214. The client 210 can communicate using the user interface (UI) module 208. For example, the UI module 208 may receive requests in the form of Hypertext Transport Protocol (HTTP) request, File Transfer Protocol (FTP), Transmission Control Protocol (TCP)/Internet Protocol (IP), Simple Object Access Protocol (SOAP), or other request.

The admin claim flow module 214 directs a user through an admin claim flow process. The admin claim flow module 214 can direct the UI 208 to prompt the user to provide information about the entity associated with the profile page of which the user is claiming admin status. The admin claim flow module 214 can direct the UI module 208 to prompt the user for required and/or non-required company and/or user information, such as the company name, the industry of the company (e.g., as selected from a list of pre-defined industry descriptions or categories), a size of the company (e.g., as selected from a list of pre-defined sizes or groups of sizes), a validation that the potential admin is an official representative of the company, such as was previously discussed, a logo for the company that can be displayed on the profile page, a description of the company (e.g., a mission statement of the company, a statement regarding the operations of the company, or other pertinent description of the company), an address of the company (e.g., city, state, zip code, country, etc.), the business type of the company, and the year the company was founded, among other data regarding the company.

The event processing module 206 can determine if a user has provided sufficient information regarding the company to become the admin of the profile page. The event processing module 206 can overwrite the admin indicator (e.g., in the profile data database 204) associated with the profile page in response to the user providing the sufficient information. The event processing module 206 can write data to the profile data database 204 as it is received from the UI module 208. As was discussed previously, a potential admin may leave (e.g., click-out of) the admin claim flow process provided by the module 214 prior to completing the required information for becoming the admin of the profile page. To help ensure that the data entered into the admin claim flow process is saved, the data entered by the potential admin can be saved as it is entered or as each field is completed. For example, if the potential admin completes the "name" field, a request to update the company data in a database can be issued by the event processing module 206 to the profile data database 204. The database (or a server of the database) can verify that the company does not have an admin prior to writing or overwriting data saved in the database 204.

Figure 3:
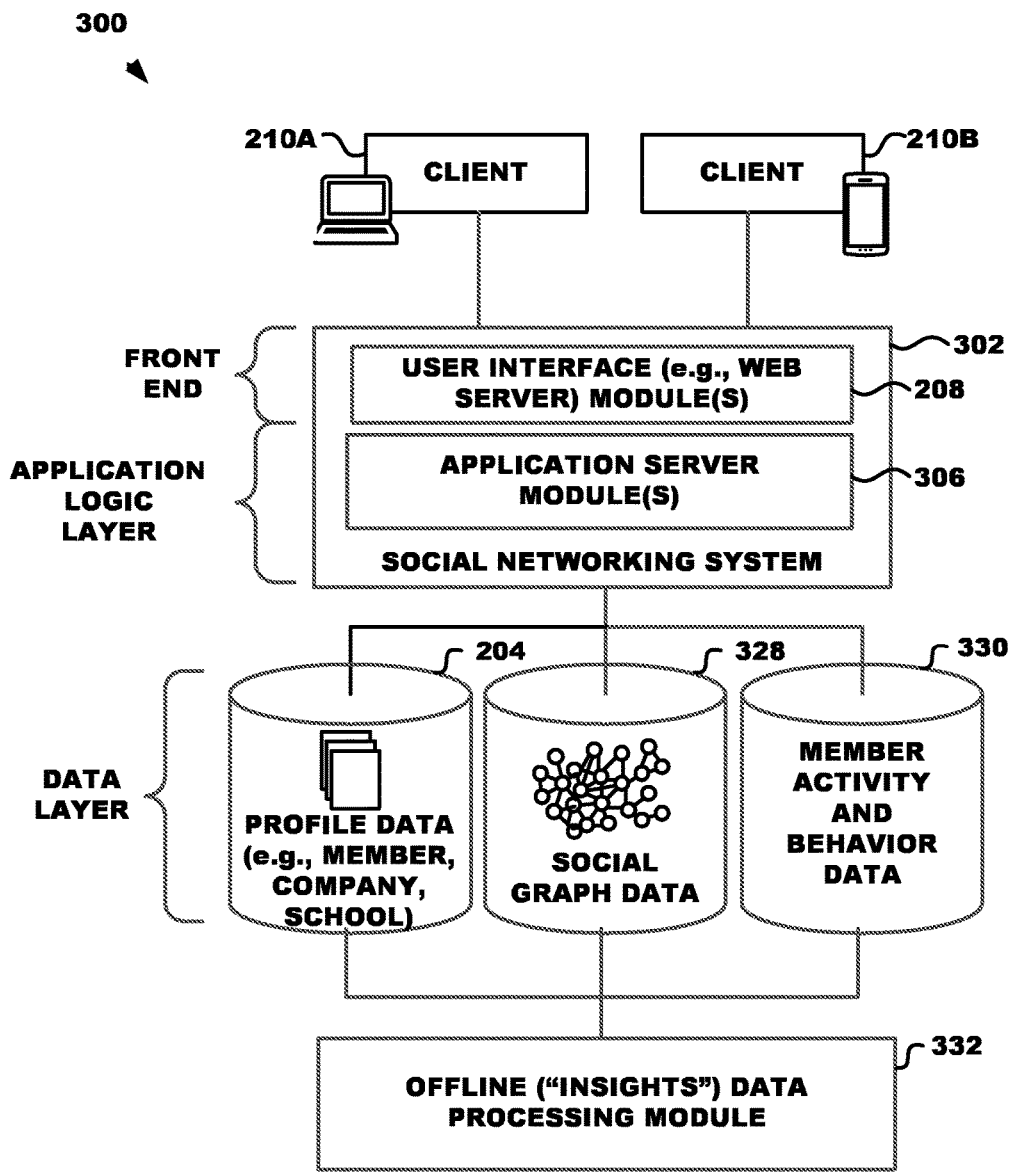
FIG. 3 illustrates, by way of example, a block diagram of an embodiment of a computer network environment in which the systems and methods discussed herein can be deployed and/or performed.

FIG. 3 illustrates, by way of example, a block diagram of an embodiment of a computer network environment 300 in which the systems and methods discussed herein can be deployed and/or performed. The system 200 can be deployed or the process 100 can be implemented using the environment 300. In one or more embodiments, the company and potential admin identification module 202 can be implemented in an offline process, such as by incorporating the module 202 in the offline data processing module 332. In one or more other embodiments, the module 202 can be implemented online, such as in application server module(s) 306. The event processing module 206 and the admin claim flow module 214 can be implemented in the application server module(s) 306.

The computer network environment 300 can include a social networking system 302 that includes one or more application server modules 306 that provide any number of applications and services that leverage the social graph data database 328 maintained by the social networking system 302. For example, the social networking system 302 may provide a photo sharing application, a job posting and browsing service, a question-and-answer service, and so forth.

The social network environment 300 can provide a social networking service. A social networking service is an online service, platform and/or site that allows users of the service to build or reflect social networks or social relations among members. Typically, users construct profiles, which may include characteristics (e.g., personal information), such as the member's name, contact information, employment information, photographs, personal messages, status information, links to web-related content, blogs, and so on. In order to build or reflect these social networks or social relations among members, the social networking environment 300 allows members to identify, and establish links or connections with other members. For instance, in the context of a business networking service (a type of social networking service), a person may establish a link or connection with his or her business contacts, including work colleagues, clients, customers, personal contacts, and so on. With a social networking service, a person may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of business networking purposes and a social networking service may likewise be used for business networking purposes as well as or in place of social networking purposes.

As shown in FIG. 3, the front end includes the user interface module 208 and the client(s) 210A and 210B. The clients 210A-B are specific instances of the client 210.

The application logic layer can include various application server modules 306, which, in conjunction with the UI module 208, generate various UIs (e.g., web pages) with data retrieved from one or more sources of various data sources in the data layer. In some embodiments, individual application server modules 306 can be used to implement the functionality associated with various applications, services and/or features of the social networking environment 300. For instance, a social networking service may provide a broad variety of applications and services, to include the ability to search for and browse profile pages, job listings, or news articles. Additionally, applications and services may allow users to share content with one another, for example, via email, messages, and/or content postings (sometimes referred to as status updates, such as on a profile page) via a data feed (e.g., specifically tailored) to a user. The application server modules 306 can provide the functionality that allows a user to claim admin status for an entity's profile page.

As shown in FIG. 3, the data layer includes several databases, such as the database 204 for storing profile data, including both user profile data as well as profile data for various entities (e.g., companies, schools, non-profit organizations, government organizations, and other organizations) represented in the social graph maintained by the social networking service, such as in the social graph data database 328. Consistent with some embodiments, when a person initially registers to become a user of the social networking service, the person can be prompted to provide some personal information, such as his or her name, age (e.g., birthdate), gender, interests, contact information, home town, address, the names of the user's spouse and/or family users, educational background (e.g., schools, majors, matriculation and/or graduation dates, etc.), employment history, skills, professional organizations, and so on. This information, generally referred to as user profile information or user characteristic(s), is stored, for example, in the database 204.

Similarly, when a representative of an organization initially registers the organization with the social networking service (e.g., represented by the social networking system 302), the representative may be prompted to provide certain information about the organization. This information—generally referred to as company profile information—may be stored, for example, in the database 204 or another database (not shown). With some embodiments, the profile data may be processed (e.g., in the background or offline, by the offline data processing module 332) to generate various derived profile data. For example, if a user has provided information about various job titles the user has held with the same or different companies, or for how long, this information can be used to infer or derive a user profile attribute indicating the user's overall seniority level, or seniority level within a particular company. With some embodiments, importing or otherwise accessing data from one or more externally hosted data sources may enhance profile data for both users and organizations. For instance, with companies in particular, financial data may be imported from one or more external data sources, and made part of a company's profile. Another example can include importing information regarding a company that has an auto-created profile page.

Once registered, a user may invite other users, or be invited by other users, to connect via the environment 300. A "connection" may require a bi-lateral agreement by the users, such that both users acknowledge the establishment of the connection. Similarly, with some embodiments, a user may elect to "follow" another user. In contrast to establishing a connection, the concept of "following" another user typically can be a unilateral operation, and at least with some embodiments, does not require acknowledgement or approval by the user that is being followed. When one user follows another user, the user who is following may receive content postings, status updates, or other content postings published by the user being followed, or relating to various activities undertaken by the user being followed. Similarly, when a user follows an organization, the user becomes eligible to receive content postings published on behalf of the organization and/or system or service-generated content postings that relate to the organization. For instance, messages or content postings published on behalf of an organization that a user is following will appear in the user's personalized feed. In any case, the various associations and relationships that the users establish with other users, or with other entities and objects, can be stored and maintained within the social graph data database 328.

As users interact with the various applications, services, or content made available via the environment 300, the users' behavior (e.g., content viewed, links selected, etc.) may be monitored and information concerning the users' behavior may be stored, for example, in the user activity and behavior data database 230. This information may be used to infer a user's intent and/or interests, and to classify the user as being in various categories. For example, if the user performs frequent searches of job listings, thereby exhibiting behavior indicating that the user is a likely job seeker, this information can be used to classify the user as a job seeker. This classification can then be used as an attribute or characteristic. The attribute or characteristic can be used by others to target the user for receiving advertisements, messages, content postings, or a recommendation. Accordingly, a company that has available job openings can publish a content posting that is specifically directed to certain users (e.g., users) of the social networking service who are likely job seekers, and thus, more likely to be receptive to recruiting efforts.

Figure 4:
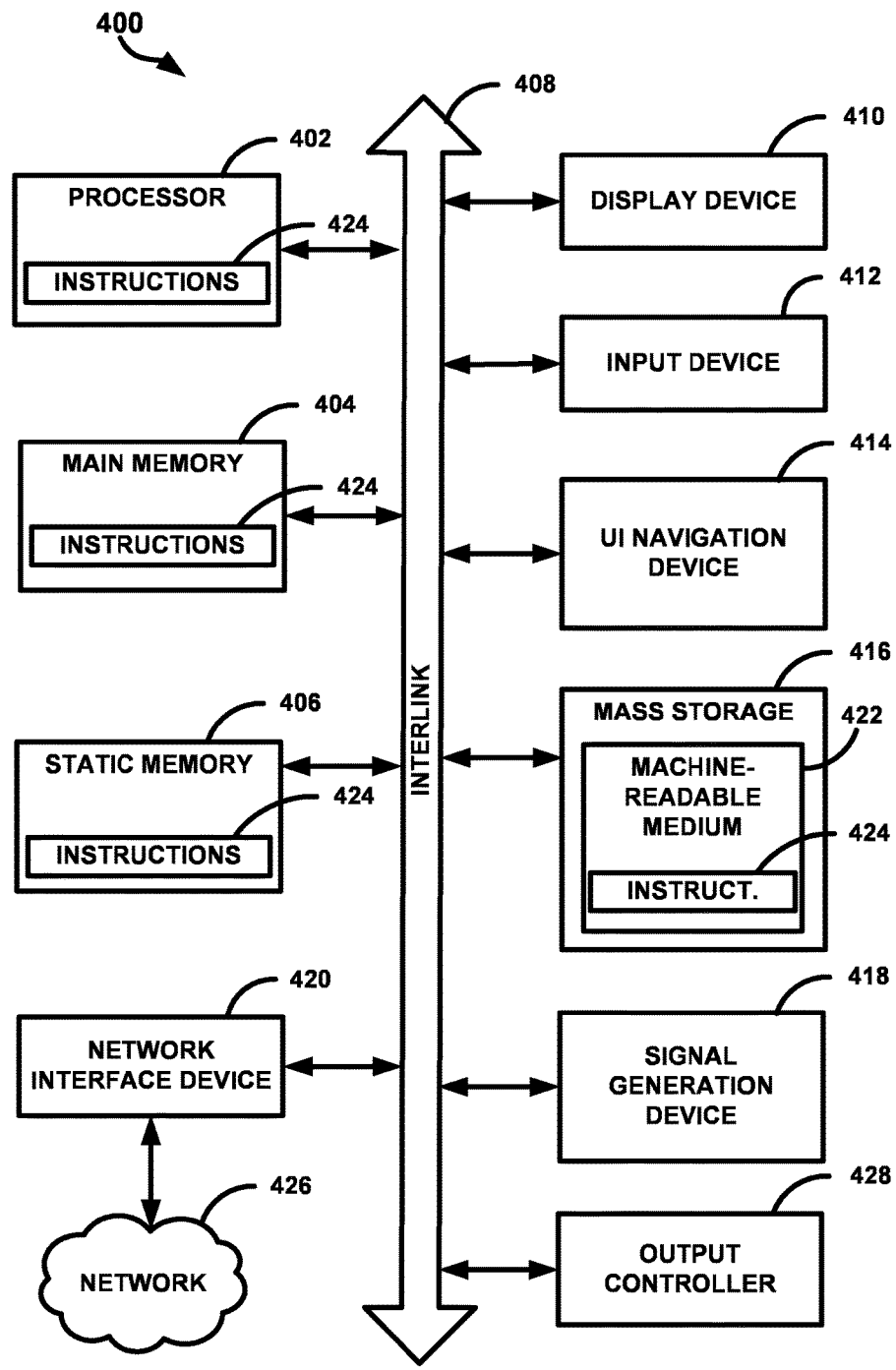
FIG. 4 illustrates, by way of example, a block diagram of an example of a device upon which any of one or more processes (e.g., methods) discussed herein can be performed.

FIG. 4 illustrates, by way of example, a block diagram of an example of a device 400 upon which any of one or more processes (e.g., methods) discussed herein can be performed. The device 400 (e.g., a machine) can operate so as to perform one or more of the programming or communication processes (e.g., methodologies) discussed herein. In some examples, the device 400 can operate as a standalone device or can be connected (e.g., networked) to one or more modules, such as the company and potential admin identification module 202, the event processing module 206, the UI module 208, the admin claim flow module 214, the client 210 (e.g., the client 210A and/or 210B), the application server module(s) 306, and/or the offline data processing module 332. An item of the system 200 or 300 can include one or more of the items of the device 400. For example one or more of the potential admin identification module 202, the profile data database 204, the event processing module 206, the UI module 208, the admin claim flow module 214, the client 210 (e.g., the client 210A and/or 210B), the application server module(s) 306, the offline data processing module 332, the social graph data database 328, and the member activity and behavior data 330 can include one or more of the items of the device 400.

Embodiments, as described herein, can include, or can operate on, logic or a number of components, modules, or mechanisms. Modules are tangible entities (e.g., hardware) capable of performing specified operations when operating. A module includes hardware. In an example, the hardware can be specifically configured to carry out a specific operation (e.g., hardwired). In an example, the hardware can include configurable execution units (e.g., transistors, logic gates (e.g., combinational and/or state logic), circuits, etc.) and a computer readable medium containing instructions, where the instructions configure the execution units to carry out a specific operation when in operation. The configuring can occur under the direction of the executions units or a loading mechanism. Accordingly, the execution units are communicatively can be coupled to the computer readable medium when the device is operating. In this example, the execution units can be a user of more than one module. For example, under operation, the execution units can be configured by a first set of instructions to implement a first module at one point in time and reconfigured by a second set of instructions to implement a second module.

Device (e.g., computer system) 400 can include a hardware processor 402 (e.g., a central processing unit (CPU), a graphics processing unit (GPU), a hardware processor core, processing circuitry (e.g., logic gates, multiplexer, state machine, a gate array, such as a programmable gate array, arithmetic logic unit (ALU), or the like), or any combination thereof), a main memory 404 and a static memory 406, some or all of which can communicate with each other via an interlink (e.g., bus) 408. The device 400 can further include a display unit 410, an input device 412 (e.g., an alphanumeric keyboard), and a user interface (UI) navigation device 414 (e.g., a mouse). In an example, the display unit 410, input device 412 and UI navigation device 414 can be a touch screen display. The device 400 can additionally include a storage device (e.g., drive unit) 416, a signal generation device 418 (e.g., a speaker), and a network interface device 420. The device 400 can include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 can include a machine readable medium 422 on which is stored one or more sets of data structures or instructions 424 (e.g., software) embodying or utilized by any one or more of the techniques or functions described herein. The instructions 424 can also reside, completely or at least partially, within the main memory 404, within static memory 406, or within the hardware processor 402 during execution thereof by the device 400. In an example, one or any combination of the hardware processor 402, the main memory 404, the static memory 406, or the storage device 416 can constitute machine readable media.

While the machine readable medium 422 is illustrated as a single medium, the term "machine readable medium" can include a single medium or multiple media (e.g., a centralized or distributed database, and/or associated caches and servers) configured to store the one or more instructions 424. The term "machine readable medium" can include any tangible medium that is capable of storing, encoding, or carrying instructions for execution by the device 400 and that cause the device 400 to perform any one or more of the techniques (e.g., processes) of the present disclosure, or that is capable of storing, encoding or carrying data structures used by or associated with such instructions. The term "machine-readable medium" shall accordingly be taken to include, but not be limited to, solid-state memories, and optical and magnetic media. Specific examples of machine-readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks. A machine readable medium does not include signals per se.

The instructions 424 can further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 420 can include one or more physical jacks (e.g., Ethernet, coaxial, or phone jacks) or one or more antennas to connect to the communications network 426. In an example, the network interface device 420 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the device 400, and includes digital or analog communications signals or other intangible medium to facilitate communication of such software.

Examples and Notes

The present subject matter can be described by way of several examples.

Example 1 can include or use subject matter (such as an apparatus, a method, a means for performing acts, or a machine readable medium including instructions that, when performed by the machine, can cause the device to perform acts), such as can include or use determining a company profile page is an auto-created company profile page, prompting one or more users with a profile that indicates the user currently works for a company associated with the company profile page to become the administrator of the company profile page, in response to a user of the one or more users responding affirmatively to the prompt, prompting the user for information regarding the company, and/or assigning administrator rights to the user in response to receiving sufficient information about the company from the user.

Example 2 can include or use, or can optionally be combined with the subject matter of Example 1, to include or use, determining a score for each of the plurality of users based on their professional experience, seniority at the company, and position at the company; and wherein prompting one or more users with a profile that indicates the user currently works for the company to become the administrator of the company profile page includes only prompting the user if the user's score is greater than a specified threshold.

Example 3 can include or use, or can optionally be combined with the subject matter of at least one of Examples 1-2 to include or use, wherein prompting the one or more users with a profile that indicates the user currently works for the company to become the administrator of the company profile page includes displaying a graphic on the company profile page that, in response to the user selecting the graphic, redirects the user to an admin claim flow process that prompts the user for the information regarding the company.

Example 4 can include or use, or can optionally be combined with the subject matter of at least one of Examples 1-3 to include or use, wherein the one or more users includes multiple users and receiving an indication that a first user has rejected the prompt to become the administrator of the company profile page, and prompting another user of the multiple users with a profile that indicates the another user currently works for a company associated with the company profile page to become the administrator of the company profile page.

Example 5 can include or use, or can optionally be combined with the subject matter of Example 4 to include or use, wherein receiving the indication that the first user has rejected the prompt to become the administrator of the company profile page includes determining that the first user has not accepted the position in a specified period of time since the user was prompted.

Example 6 can include or use, or can optionally be combined with the subject matter of at least one of Examples 1-5 to include or use, providing a secure token to a first user of the one or more users that accepts the administrator position, wherein the secure token is needed to access an admin claim flow process that prompts the user for the information regarding the company.

Example 7 can include or use, or can optionally be combined with the subject matter of Example 6 to include or use, wherein the secure token is a hash value of a string that includes at least one of a company identification, a company name, and an industry identification number of the company.

Example 8 can include or use, or can optionally be combined with the subject matter of Example 7 to include or use, directing a second user of the one or more users to the admin claim flow process in response to receiving the secure token from the second user.

Example 9 can include or use, or can optionally be combined with the subject matter of Example 8 to include or use, verifying that the second user includes a profile that indicates the second user currently works for the company before directing the second user to the admin claim flow process.

Example 10 can include or use, or can optionally be combined with the subject matter of at least one of Examples 1-9 to include or use, before assigning administrator rights to the user, determining if the user has provided required information about the company, and in response to determining the user has not provided the required information about the company, prompting the user to provide more information about the company and indicating to the user that they will not been assigned administrator of the company profile page until they provide the required information.

Example 11 can include or use subject matter (such as an apparatus, a method, a means for performing acts, or a machine readable medium including instructions that, when performed by the machine, can cause the device to perform acts), such as can include or use receiving data identifying a company that has a company profile page on a social networking site that does not have an admin, identifying one or more users that are potential administrators for the company profile page, sending a communication to the one or more users prompting the one or more users to become the administrator of the company profile page, receiving a communication indicating whether the one or more users accepted or rejected the administrator position, directing a user of the one or more users that accepted the administrator position to an administrator claim flow process that prompts the user for the information regarding the company, and/or assigning administrator rights to the user in response to receiving sufficient information about the company from the user.

Example 12 can include or use, or can optionally be combined with the subject matter of Example 1 to include or use, wherein the company includes an auto-created company profile page.

Example 13 can include or use, or can optionally be combined with the subject matter of at least one of Examples 11-12 to include or use receiving an indication that a first user has rejected the administrator position, and sending a communication to a second user of the one or more users prompting the second user to become the administrator of the company profile page in response to receiving the indication that the first user has rejected the administrator position.

Example 14 can include or use, or can optionally be combined with the subject matter of Example 13 to include or use, wherein receiving the indication that the first user has rejected the administrator position of the company profile page includes determining that the first user has not accepted the position in a specified period of time since the communication was sent to the user.

Example 15 can include or use, or can optionally be combined with the subject matter of at least one of Examples 11-14 to include or use providing a secure token to a first user of the one or more users that accepts the administrator position, wherein the secure token is needed to access the admin claim flow process.

Example 16 can include or use, or can optionally be combined with the subject matter of Example 15 to include or use, wherein the secure token is a hash value of a string that includes at least one of a company identification, a company name, and an industry identification number of the company.

Example 17 can include or use, or can optionally be combined with the subject matter of Example 16 to include or use directing a second user of the one or more users to the admin claim flow process in response to receiving the secure token from the second user.

Example 18 can include or use subject matter (such as an apparatus, a method, a means for performing acts, or a machine readable medium including instructions that, when performed by the machine, can cause the device to perform acts), such as can include or use one or more hardware processors, one or more memories communicatively coupled to the one or more hardware processors, the one or more memories including stored thereon, the one or more memories further including instructions stored thereon, which when executed by the one or more processors, cause the one or more processors to perform operations comprising: receiving data identifying a company that has a company profile page on a social networking site that does not have an admin, identifying one or more users that are potential administrators for the company profile page, sending a communication to the one or more users prompting the one or more users to become the administrator of the company profile page, receiving a communication indicating whether the one or more users accepted or rejected the administrator position, directing a user of the one or more users that accepted the administrator position to an administrator claim flow process that prompts the user for the information regarding the company, and assigning administrator rights to the user in response to receiving sufficient information about the company from the user.

Example 19 can include or use, or can optionally be combined with the subject matter of Example 18 to include or use, wherein the company includes an auto-created company profile page.

Example 20 can include or use, or can optionally be combined with the subject matter of at least one of Examples 18-19 to include or use, wherein the operations further comprise receiving an indication that a first user has rejected the administrator position, and sending a communication to a second user of the one or more users prompting the second user to become the administrator of the company profile page in response to receiving the indication that the first user has rejected the administrator position.

Example 21 can include or use, or can optionally be combined with the subject matter of Example 20 to include or use, wherein receiving the indication that the first user has rejected the administrator position of the company profile page includes determining that the first user has not accepted the position in a specified period of time since the communication was sent to the user.

Example 22 can include or use, or can optionally be combined with the subject matter of at least one of Examples 18-21 to include or use providing a secure token to a first user of the one or more users that accepts the administrator position, wherein the secure token is needed to access the admin claim flow process.

Example 23 can include or use, or can optionally be combined with the subject matter of Example 22 to include or use, wherein the secure token is a hash value of a string that includes at least one of a company identification, a company name, and an industry identification number of the company.

Example 24 can include or use, or can optionally be combined with the subject matter of Example 23 to include or use directing a second user of the one or more users to the admin claim flow process in response to receiving the secure token from the second user.

The above Description of Embodiments includes references to the accompanying figures, which form a part of the detailed description. The figures show, by way of illustration, specific embodiments in which methods, apparatuses, and systems discussed herein can be practiced. These embodiments are also referred to herein as "examples" or "embodiments". Such embodiments (e.g., examples) can include elements in addition to those shown or described. However, the present inventors also contemplate embodiments in which only those elements shown or described are provided. Moreover, the present inventors also contemplate embodiments using any combination or permutation of those elements shown or described (or one or more aspects thereof), either with respect to a particular embodiment (or one or more aspects thereof), or with respect to other embodiments (or one or more aspects thereof) shown or described herein.

The flowchart and block diagrams in the FIGS. illustrate the architecture, functionality, and operation of possible implementations of systems, methods and computer program products according to various aspects of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The functions or techniques described herein can be implemented in software or a combination of software and human implemented procedures. The software can consist of computer executable instructions stored on computer readable media such as memory or other type of storage devices. The term "computer readable media" is also used to represent any means by which the computer readable instructions can be received by the computer, such as by different forms of wired or wireless transmissions. Further, such functions correspond to modules, which are software, hardware, firmware or any combination thereof. Multiple functions can be performed in one or more modules as desired, and the embodiments described are merely examples. The software can be executed on a digital signal processor, ASIC, microprocessor, or other type of processor operating on a computer system, such as a personal computer, server or other computer system.

The above description is intended to be illustrative, and not restrictive. For example, the above-described embodiments (or one or more aspects thereof) can be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Description of Embodiments, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A non-transitory machine readable medium comprising instructions stored thereon, which when executed by a machine cause the machine to perform operations for prompting a user of a social networking site to be an administrator of a company profile page comprising:
   auto-generating the company profile page by:
      analyzing employment history in profiles of users of the social networking site:
      identifying a company in the employment history that does not have an associated company profile page by looking up a company name and a corresponding company identification number in a database: and
      in response to identifying the company does not have the associated company profile page, generating the company profile page based on data from the profiles and a company website;
   identifying the company profile page does not have an administrator by determining an indicator associated with the company profile page in the database indicates the company profile page does not currently have an administrator;
   identifying the company profile page is an auto-created company profile page by determining an entry associated with the company profile page in the database indicates the profile page was auto-created;
   in response to identifying the company profile page does not have an administrator and the company profile page is an auto-created company profile page, identifying a plurality of a first users that include a profile on the social networking site that indicates a respective user currently works for a company associated with the company profile page;
   determining a score for each of the first users based on attributes including their professional experience, seniority at the company, and position at the company as detailed in the respective profile page, wherein the score is determined by a multiplication of respective weights for respective attributes and respective values associated with the respective attributes to create respective weighted attribute values and a summation of the respective weighted attribute values;
   prompting the user of the first users with a determined greatest score to become the administrator of the company profile page;
   in response to the user responding affirmatively to the prompt, prompting the user for information regarding the company to verify that the user works for the company and to fill in information of the company profile page; and
   in response to receiving sufficient information about the company from the user, assigning administrator rights for the company profile page to the user.

2. The medium of claim 1, wherein the operations further comprise:
   wherein prompting the user with a determined greatest total score includes only prompting the user if the user's score is greater than a specified threshold.

3. The medium of claim 1, wherein prompting the plurality of users with a profile that indicates the user currently works for the company to become the administrator of the company profile page includes displaying a graphic on the company profile page that, in response to the user selecting the graphic, redirects the user to an admin claim flow process that prompts the user for the information regarding the company.

4. The medium of claim 1, wherein the operations further comprise:
   receiving an indication that the user has rejected the prompt to become the administrator of the company profile page; and
   prompting another user of the first users with a profile that indicates the another user currently works for a company associated with the company profile page to become the administrator of the company profile page.

5. The medium of claim 4, wherein receiving the indication that the user has rejected the prompt to become the administrator of the company profile page includes determining that the user has not accepted the position in a specified period of time since the user was prompted.

6. The medium of claim 1, wherein the operations further comprise providing a secure token to the user of the first users that accepts the administrator position, wherein the secure token is needed to access an admin claim flow process that prompts the user for the information regarding the company.

7. The medium of claim 6, wherein the secure token is a hash value of a string that includes at least one of a company identification, a company name, and an industry identification number of the company.

8. The medium of claim 7, further comprising:
   directing a second user of the first users to the admin claim flow process in response to receiving the secure token from the second user.

9. The medium of claim 8, further comprising:
   verifying that the second user includes a profile that indicates the second user currently works for the company before directing the second user to the admin claim flow process.

10. The medium of claim 1, further comprising:
    before assigning administrator rights to the user, determining if the user has provided required information about the company; and
    in response to determining the user has not provided the required information about the company, prompting the user to provide more information about the company and indicating to the user that they will not been assigned administrator of the company profile page until they provide the required information.

11. A method comprising operations performed using one or more hardware processors, the operations comprising:
    auto-generating a company profile page by:
       analyzing employment history in profiles of users of a social networking site:
       identifying a company in the employment history that does not have an associated company profile page by looking up a company name and a corresponding company identification number in a database: and
       in response to identifying the company does not have the associated company profile page, generating the company profile page based on data from the profiles and a company website;
    receiving data identifying the company that has the company profile page on the social networking site does not have an administrator;
    receiving data identifying the company profile page is an auto-created profile page created automatically based on information in user profiles;
    In response to identifying the company profile page does not have an administrator and the company profile page is an auto-created company profile page, identifying a plurality of a first users that include a profile on the social networking site that indicates a respective user currently works for a company associated with the company profile page:

determining a score for each of the plurality of the first users based on attributes including their professional experience, seniority at the company, and position at the company as detailed in the respective profile page, wherein the score is determined by a multiplication of respective weights for respective attributes and respective values associated with the respective attributes to create respective weighted attribute values and a summation of the respective weighted attribute values;

sending a communication to one or more users of the first users prompting the one or more users with a determined greatest score to become the administrator of the company profile page;

receiving a communication indicating whether the one or more users accepted or rejected the administrator position;

directing a user of the one or more users that accepted the administrator position to an administrator claim flow process that prompts the user for the information regarding the company; and in response to receiving sufficient information about the company from the user, assigning administrator rights to the user.

12. The method of claim 11, further comprising:
receiving an indication that the user has rejected the administrator position, and sending a communication to a second user of the plurality of the first users prompting the second user to become the administrator of the company profile page in response to receiving the indication that the user has rejected the administrator position.

13. The method of claim 12, wherein receiving the indication that the user has rejected the administrator position of the company profile page includes determining that the user has not accepted the position in a specified period of time since the communication was sent to the user.

14. The method of claim 11, further comprising providing a secure token to a first user of the plurality of first users that accepts the administrator position, wherein the secure token is needed to access the admin claim flow process.

15. The method of claim 14, wherein the secure token is a hash value of a string that includes at least one of a company identification, a company name, and an industry identification number of the company.

16. A system comprising:
one or more hardware processors;
one or more memories communicatively coupled to the one or more hardware processors, the one or more memories including stored thereon, the one or more memories further including instructions stored thereon, which when executed by the one or more processors, cause the one or more processors to perform operations comprising:
auto-generating a company profile page by:
analyzing employment history in profiles of users of a social networking site;
identifying a company in the employment history that does not have an associated company profile page by looking up a company name and a corresponding company identification number in a database; and
in response to identifying the company does not have the associated company profile page, generating the company profile page based on data from the profiles and a company website:
receiving data identifying the company that has the company profile page on a social networking site does not have an administrator;
receiving data identifying the company profile page is an auto-created profile page created automatically based on information in user profiles;
in response to identifying the company profile page does not have an administrator and the company profile page is an auto-created company profile page, identifying a plurality of a first users that include a profile on the social networking site that indicates a respective user currently works for a company associated with the company profile page;
determining a score for each of the plurality of the first users based on attributes including their professional experience, seniority at the company, and position at the company as detailed in the respective profile page, wherein the score is determined by a multiplication of respective weights for respective attributes and respective values associated with the respective attributes to create respective weighted attribute values and a summation of the respective weighted attribute values;
sending a communication to one or more of the first users prompting the one or more users with determined greatest scores to become the administrator of the company profile page;
receiving a communication indicating whether the one or more users accepted or rejected the administrator position;
directing a user of the one or more users that accepted the administrator position to an administrator claim flow process that prompts the user for the information regarding the company; and
in response to receiving sufficient information about the company from the user, assigning administrator rights to the user.

17. The system of claim 16, wherein the operations further comprise: receiving an indication that the user has rejected the administrator position; and sending a communication to a second user of the plurality of the first users prompting the second user to become the administrator of the company profile page in response to receiving the indication that the user has rejected the administrator position.

18. The system of claim 17, wherein receiving the indication that the user has rejected the administrator position of the company profile page includes determining that the user has not accepted the position in a specified period of time since the communication was sent to the user.

* * * * *

UNITED STATES PATENT AND TRADEMARK OFFICE
CERTIFICATE OF CORRECTION

PATENT NO. : 10,181,163 B2
APPLICATION NO. : 14/725539
DATED : January 15, 2019
INVENTOR(S) : Santos et al.

Page 1 of 1

It is certified that error appears in the above-identified patent and that said Letters Patent is hereby corrected as shown below:

In the Claims

In Column 19, Line 12, in Claim 1, delete "site:" and insert --site;-- therefor

In Column 19, Line 16, in Claim 1, delete "database:" and insert --database;-- therefor In Column 20, Line 51, in Claim 11, delete "site:" and insert --site;-- therefor In Column 20, Line 55, in Claim 11, delete "database:" and insert --database;-- therefor In Column 20, Line 66, in Claim 11, delete "In" and insert --in-- therefor In Column 21, Line 5, in Claim 11, delete "page:" and insert --page;-- therefor In Column 21, Line 32, in Claim 12, after "and", insert --¶--

In Column 22, Line 11, in Claim 16, delete "website:" and insert --website;-- therefor Signed and Sealed this
Sixteenth Day of November, 2021

Drew Hirshfeld
*Performing the Functions and Duties of the*
*Under Secretary of Commerce for Intellectual Property and*
*Director of the United States Patent and Trademark Office*